United States Patent [19]
Fulmer

[11] Patent Number: 4,724,674
[45] Date of Patent: Feb. 16, 1988

[54] HYDRAULIC BRAKE BOOSTER

[75] Inventor: Keith H. Fulmer, Mishawaka, Ind.

[73] Assignee: Allied Corporation, Morristown, N.J.

[21] Appl. No.: 793,022

[22] Filed: Oct. 30, 1985

[51] Int. Cl.⁴ .............................................. B60T 13/12
[52] U.S. Cl. ........................................ 60/548; 60/554; 60/570; 60/582
[58] Field of Search ................. 60/554, 570, 547.1, 60/550, 582, 548; 92/29; 91/391 R, 391 A

[56] References Cited

U.S. PATENT DOCUMENTS

| | | | |
|---|---|---|---|
| 2,106,304 | 1/1938 | McGee | 60/570 |
| 3,106,874 | 10/1963 | Schultz | 60/547.1 |
| 4,126,996 | 11/1978 | Leiber | 60/554 |
| 4,326,379 | 4/1982 | Dauvergne | 60/554 |
| 4,490,977 | 1/1985 | Fulmer | 60/547.1 |
| 4,514,981 | 5/1985 | Brown | 60/547.1 |
| 4,569,271 | 2/1986 | Reynolds | 92/29 |

FOREIGN PATENT DOCUMENTS

| | | |
|---|---|---|
| 0082367 | 6/1983 | European Pat. Off. . |
| 2436059 | 2/1976 | Fed. Rep. of Germany ........ 60/570 |
| 2452095 | 5/1976 | Fed. Rep. of Germany . |
| 3404015 | 8/1985 | Fed. Rep. of Germany . |

*Primary Examiner*—Abraham Hershkovitz
*Attorney, Agent, or Firm*—Larry J. Palguta; Ken C. Decker

[57] ABSTRACT

The hydraulic brake booster (12) includes a resilient member (96) disposed between an input member (94, 194, 294) and a pair of valve members (98, 101; 112) which control fluid pressure flow from an accumulator (14). When the input member (94, 194, 294) is actuated by the vehicle operator, theresilient member (96) is compressed so that the input member (94, 194, 294) moves relative to the valve members (98, 101; 112) and thus provides for greater movement of the input member (94, 194, 294) than for the valve members (98, 101; 112). The booster (12) includes a hydraulic or mechanical lockout which, in the absence of fluid pressure from the accumulator (14), eliminates the movement of the input member (94, 194, 294) relative to the valve members (98, 101; 112) so that the relative movement eliminated is not added to the valve stroke during manual operation of the booster (12).

18 Claims, 6 Drawing Figures

HYDRAULIC BRAKE BOOSTER

This invention relates to a hydraulic brake booster incorporated into a vehicle brake system to provide a power assist during a brake application. More particularly, the invention relates to a booster commonly referred to in the art as a "full power" brake booster, such as those disclosed in copending application Ser. Nos. 793,015; 793,021; and 806,300.

In a "full-power" brake booster, an accumulator is charged with fluid pressure for selective use in providing a power assist. The accumulator is communicated to a booster housing and a valve assembly is operable to control communication of fluid pressure from the accumulator to a power chamber wherein the fluid pressure acts against at least one piston to communicate fluid from the housing to a brake circuit. The valve assembly is enclosed within a sleeve assembly and an input member is movable relative to the sleeve assembly to control operation of the valve assembly.

In order to provide pedal travel for a full power brake booster, it has been proposed to provide a lost-motion connection between the input member and the pedal assembly. The lost-motion connection requires modification of the pedal assembly or the input member to accommodate or carry a resilient member therebetween. This has been accomplished in U.S. Pat. No. 4,490,977 entitled "HYDRAULIC BRAKE BOOSTER" and assigned to the same assignee as herein.

The present invention provides an improvement for a full power brake booster wherein pedal travel is provided during normal operation of the brake booster, and then the pedal travel is effectively eliminated when the brake booster is operated in the manual mode. When a full power brake booster experiences a failure of pressure supplied by the accumulator, any lost-motion or false travel connection between the input member and the pedal assembly must be added to the valve stroke. As a result, there is required a higher than normal brake pedal position for the normally operating power mode, in order to compensate for the operation during a manual mode. To overcome the problem of requiring a high brake pedal position because the lost-motion connection must be added to the valve stroke for a manual mode operation, the present invention provides novel means for effectively locking or coupling together the input member and the sleeve assembly so that they travel together during operation in the manual mode and fully eliminate the lost-motion connection.

The present invention provides a hydraulic brake booster and accumulator for storing pressure used selectively during braking to provide a power assist, a booster housing forming a bore communicating with the accumulator, a pair of pistons movable within the bore to communicate fluid from the bore to respective brake circuits during braking, a sleeve assembly disposed within the bore and cooperating with one of the pistons to form a power chamber, the sleeve assembly carrying therein a pair of valve members, one of the valve members normally closing communication between the power chamber and the accumulator and the other valve member normally venting the power chamber to the reservoir, an input member cooperating with the pair of valve members to move the valve members during braking such that the one valve member communicates the accumulator with the power chamber and the other valve member closes communication between the power chamber and the reservoir, the input member cooperating with the pair of valve members by means of a resilient block, the other valve member sealingly engaging an interior bore of the sleeve assembly to provide a fluid chamber communicating with the reservoir and with an interior chamber of the other valve member which contains the resilient block engaged at one end by the input member which sealingly engages the interior chamber of the other valve member, and seal means disposed about the sleeve assembly so that upon axial displacement the seal means isolates the fluid chamber and interior chamber from the reservoir to provide a hydraulic or fluid block which hydraulically couples together the input member, other valve member, and sleeve assembly for operation in the manual mode. A second embodiment includes a sleeve member disposed about a reduced diameter portion of the sleeve assembly, one end of the sleeve member sealingly engaging the housing bore to define a chamber between the reduced diameter portion and end of the sleeve member, the sleeve member and sleeve assembly having radial openings permitting venting of fluid from a fluid chamber to the reservoir, the sleeve assembly having locking means aligned with receptacle means in the input member and the sleeve member having an actuation surface adjacent the locking means, the sleeve member biased by a spring axially toward the power chambers so that failure of fluid pressure from the accumulator results in axial movement of the sleeve member wherein the actuation surface moves the locking means into engagement with the receptacle means so that the input member is effectively coupled to the sleeve assembly and the lost-motion connection or false travel provided by the resilient block is eliminated. A third embodiment comprises the sleeve assembly providing slidable support for peripheral piston means extending through a seal supported by the sleeve assembly, the piston means extending into the chamber between the end of the sleeve member and reduced diameter portion so that failure of accumulator pressure results in axial movement of the sleeve member and actuation of the locking means. A fourth embodiment comprises the sleeve assembly and above-described sleeve member having a pair of aligned fluid passages communicating with the interior bore of the sleeve assembly, failure of accumulator fluid pressure permitting the spring to displace axially the sleeve member so that the fluid passages are moved out of alignment and the interior bore hydraulically isolated so that a hydraulic block effectively couples together the input member and sleeve assembly to eliminate the lost-motion connection provided by the resilient block.

The present invention provides a one-piece sleeve assembly which carries the valve members, input member, and resilient block, and certain embodiments include a sleeve member disposed about the sleeve assembly and carried thereby.

The invention will now be described with reference to the accompanying drawings, which illustrate embodiments of the invention:

Figure 1:
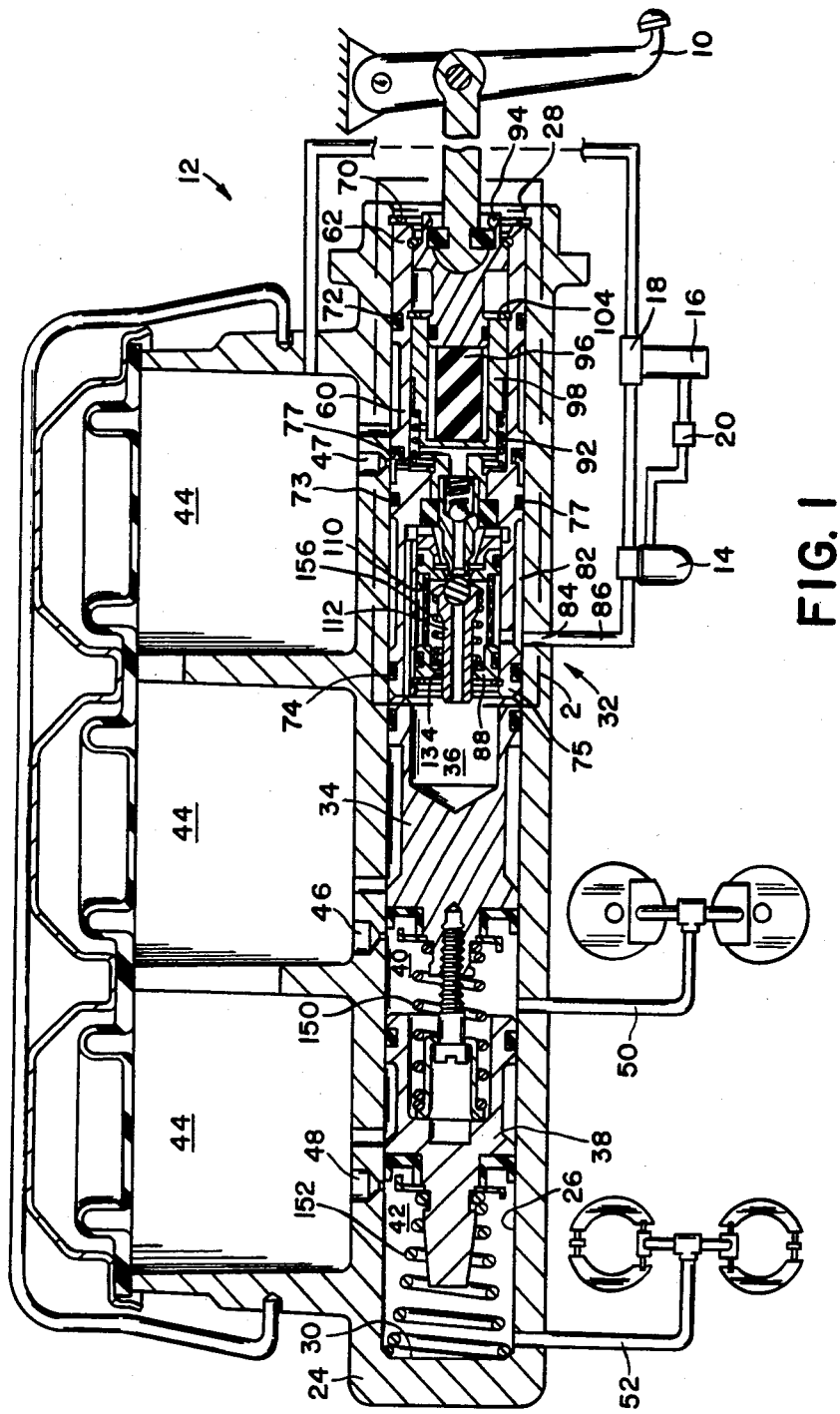
FIG. 1 is a brake system with a full power hydraulic brake booster shown in cross section.
Figure 2:
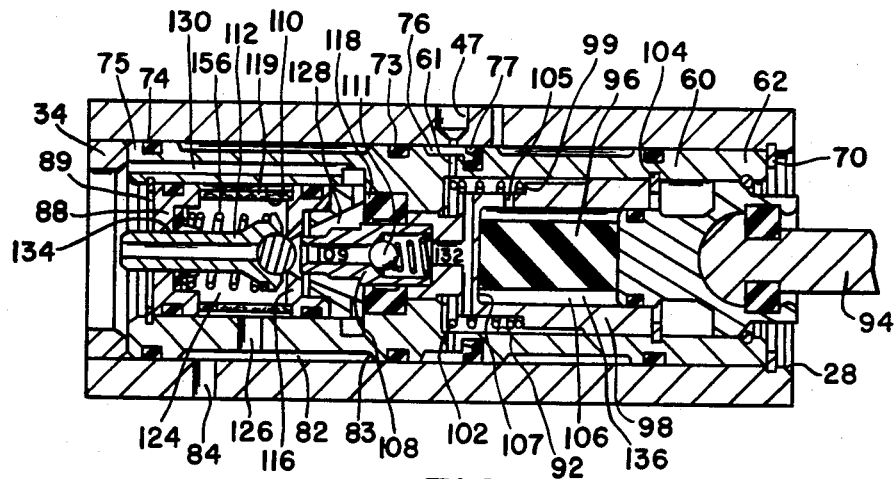
FIG. 2 is an enlarged partial view of FIG. 1.

The brake system in FIGS. 1 and 2 includes a brake pedal 10 coupled to a brake booster 12 and an accumulator 14 charged with fluid pressure by an electric motor 16 driving a pump 18. In order to maintain the fluid pressure within the accumulator 14 above a predetermined pressure level, an electronic control unit 20 with a pressure sensitive switch is provided between accumulator 14 and electric motor 16 to control operation of motor 16 and pump 18.

The brake booster 12 provides a housing 24 defining a uniform diameter housing bore 26 extending from the opening 28 at one end of housing 24 to an end wall 30 at the other end of housing 24. A valve assembly 32 is disposed at one end of the housing in bore 26. The first piston 34 is disposed within bore 26 and cooperates with the valve assembly 32 to form a power chamber 36. A second piston 38 cooperates with the first piston 34 to form a first pressure chamber 40 and also cooperates with the end wall 30 to form a second pressure chamber 42. Housing 24 defines a multi-section reservoir 44 which communicates fluid via compensation ports 46 and 48 with chambers 40 and 42, respectively. Fluid communicated from the reservoir to chambers 40 and 42 is pressurized during braking, in a manner to be described hereinafter, to communicate fluid pressure to the respective brake circuits 50 and 52.

The valve assembly 32 includes a one-piece sleeve assembly 60 with end 62 abutting a snap-ring 70 fixedly disposed at opening 28. The sleeve assembly 60 carries a seal 72 adjacent snap-ring 70, a seal 73 at its midportion adjacent the compensation port 47, and seal 74 adjacent end 75. Adjacent compensation port 47 is seal 77 which together with seal 73 defines a return chamber 76 providing for fluid flow from the interior chamber 106 to the reservoir 44. The seals 73 and 74 define an inlet chamber 82 which communicates with accumulator 14 via inlet 84 and conduit 86. End 75 of sleeve assembly 60 abuts the piston 34 to form therewith the power chamber 36.

The sleeve assembly 60 forms a stepped interior bore 92 to movably receive an input member 94, a resilient travel block or member 96 and a valve member 98. Stepped interior bore 92 includes snap-ring 104 providing an abutment for valve member 98. Valve member 98 includes the interior chamber 106 receiving therein the resilient block which is disposed between input member 94 and end wall 107 of chamber 106. Valve member 98 includes an exterior shoulder 99 providing a seat for spring 102 that biases valve member 98 toward input member 94. Valve member 98 includes radial opening 105 providing fluid communication with chamber 106, interior bore 92, sleeve assembly passage 61, compensation port 47, and reservoir 44. The left end of sleeve assembly 60 forms a stepped interior bore 110 receiving the left end of valve member 98. Valve member 112 is movably disposed within bore 110 and coaxial with valve member 98. Valve member 98 includes an extension 108 having through opening 109 with spring and ball valve assembly 111 disposed therein. Extension 108 extends through reaction disc 118 toward the end of valve member 112 which engages the valve seat 116. Valve seat 116 is disposed between spacer 117 and hydrualic fluid filter 119, the filter 119 disposed between valve seat 116 and end member 88 held within sleeve assembly 60 by snap-ring 89. A spring 156 biases valve member 112 into seating engagement with valve seat 116 so that a chamber 124 in communication with the inlet chamber 82 via radial opening 126, is closed to a chamber 128 in communication with the power chamber 36 via an axially extending passage 130 formed within sleeve member assembly 60. Valve member 98 forms a passage 132 communicating with opening 109 which is normally in communication with chambers 128 and 36 so that fluid flows through theses chambers and valve assembly passage 61 and compensation port 47. The end member 88 forms an opening 134 for movably receiving valve member 112 so that the member 112 is exposed to the power chamber 36.

The interior chamber 106 within valve member 98 forms a circular wall 136 which receives and supports the resilient travel block 96 by means of its edges in accordance with U.S. Pat. No. 4,490,977 incorporated by reference herein.

The brake booster 12 is shown in FIGS. 1 and 2 in the rest position. When a vehicle operator steps on the pedal 10, the input member 94 will move initially to the left to deform the resilient travel block or member 96 within interior chamber 106. The resilient travel block 96 deforms to permit a predetermined amount of travel between input member 94 and valve member 98. Thereafter, valve member 98 is moved within sleeve assembly 60 to abut the extension 108 with valve member 112. Because fluid pressure from accumulator 14 is received within chamber 82 and acts against the enlarged diameter 83 of sleeve assembly 60, assembly 60 remains motionless during the normal power operation of the hydrualic brake booster. The through opening 109 is closed and valve member 98 via extension 108 passes through seat 116 to separate therefrom the valve member 112. Valve member 98 forms a clearance with valve seat 116 so that fluid pressure within chamber 124 flows through chamber 128 and passage 130 to power chamber 36. Fluid pressure in the power chamber 36 acts against first piston 34 to move it to the left to close compensation port 46 and communicate fluid pressure from pressure chamber 40 to brake circuit 50. In a similar manner, moving piston 34 biases second piston 38 to the left as a result of the pressure build-up in chamber 40 and the contraction of the spring 150. Consequently, movement of second piston 38 contracts spring 152 and closes compensation port 48 to communicate fluid pressure from chamber 42 to brake circuit 52.

With valve member 98 engaging valve member 112 to communicate fluid pressure to chambers 128 and 36, the fluid pressure in power chamber 36 acts against the left end of valve member 112 and also against reaction disc 118 to oppose movement of the input member 94 and provide the vehicle operator with the pedal "feel" or resistance during braking. Upon termination of braking, the pedal 10 is returned to its rest position and spring 102 biases valve member 98, resilient block 96, and input member 94 to the position shown in FIG. 1. Meanwhile, the spring 156 biases valve member 112 to return to seat 116. The spring 102, having already returned valve member 98 toward its at-rest position, causes extension 108 to separate from valve member 112, and this opens opening 109, passage 132, assembly passage 61 and compensation port 47 to reservoir 44 so that fluid pressure in power chamber 36 may be vented to reservoir 44. Therefore, power chamber 36 is communicated with reservoir 44 via passage 130, chamber 128, opening 109, passage 132, passage 61, and compensation port 47. The springs 150 and 152 cooperate to move first piston 34 and second piston 38 to the rest position shown in FIG. 1.

If a failure of fluid pressure should be experienced because of the failure of accumulator or leakage of the system, the sleeve assembly 60 will move to the left when the vehicle operator steps on the pedal 10 and imparts axial motion to input member 94. The lack of fluid pressure within chamber 82 permits the sleeve assembly 60 to move axially to the left, the movement of input member 94 causing slight compression of resilient block 96 and movement of valve member 98. The slight axial movement of sleeve assembly 60 advances seal 77 past port 47 so that the interior bore 92 is effectively isolated from reservoir 44. As a result, the fluid contained in bore 92 and chamber 106 are effectively isolated from reservoir 44 so that a fluid or hydraulic block is provided therein. This results in no further compression of resilient block 96 and the hydrualic coupling together of input member 94, valve member 98 and sleeve assembly 60 for joint axial movement. The spring and ball valve assembly 111 prevents fluid leakage to depleted chamber 128. Thus, during the manual mode of operation, the lost-motion travel provided by the resilient block is effectively eliminated so that sleeve assembly 60 moves directly in response to axial movement of input member 94, movement of sleeve assembly 60 causing movement of piston 34 and effecting pressurization of fluid pressure in chamber 40 and, indirectly, in chamber 42, to operate the brake assemblies 50 and 52, respectively.

Figure 3:
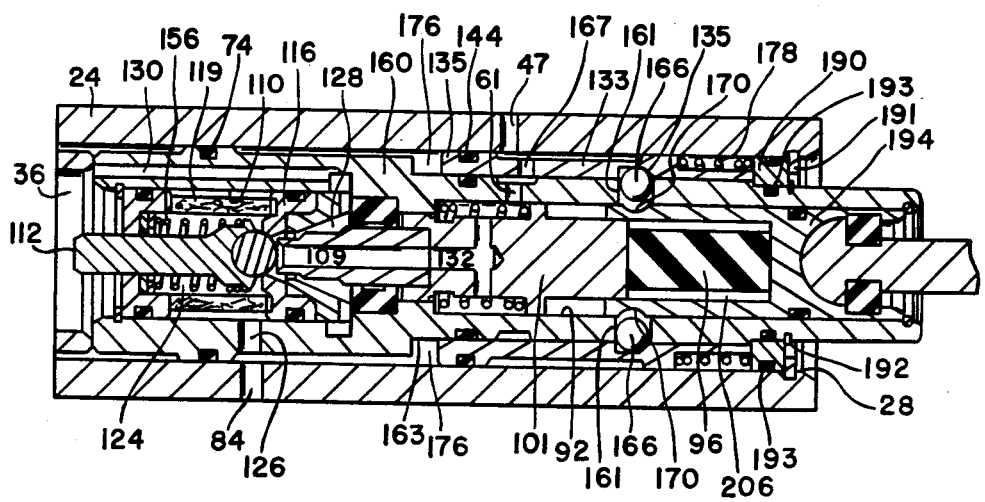
FIG. 3 is a second embodiment of the invention.

Referring now to FIG. 3, a second embodiment of the present invention is provided and like structure will be identified by the same reference numerals used in FIGS. 1 and 2. In FIG. 3, the sleeve assembly 160 includes a reduced diameter portion 163 which receives thereabout sleeve member 133. Sleeve assembly 160 has radial openings 161 receiving locking balls 166 therein and aligned with grooved receptacle 170 located in the left end of the input member 194. Input member 194 includes an interior chamber 206 with resilient block 96 disposed therein between the end of the chamber 206 and valve member 101. The interior bore 92 communicates via assembly passage 61 with sleeve member opening 167 so that fluid pressure received from power chamber 36 may be communicated through longitudinal opening 130 to chamber 128, through opening 109, passage 132, interior bore 92, and compensation port 47 to reservoir 44. Sleeve member 133 includes an end 135 having seal 144 thereabout in order to define the chamber 176 which receives fluid pressure from accumulator 14 via inlet 84. Sleeve member 133 includes actuation surface 135 disposed adjacent the locking balls 166. A spring 178 is disposed between a shoulder of sleeve member 133 and a stop member 190 abutting snap ring 191. Stop member 190 provides an abutment for spring 178 and also engages snap-ring 192 seated in sleeve assembly 160. Seals 193 prevent fluid leakage from the open end 28 of master cylinder booster housing 24.

The operation of the booster 10 illustrated in FIG. 3 is in accordance with the above-described procedure, wherein the movement of input member 194 compresses resilient block 96 and moves valve member 101 to displace valve member 112 from seat 116 so that fluid pressure is communicated to chamber 128, passage 130, and the power chamber 36. When in the at-rest position shown in FIG. 3, fluid pressure in power chamber 36 is normally vented via passage 130 to chamber 28, through opening 109 and passage 132 to interior bore 92, through assembly passage 61 and sleeve opening 167 to compensation port 47 and reservoir 44.

When there is a failure of fluid pressure provided to chamber 176, the decrease in fluid pressure therein permits the spring 178 to displace axially leftward sleeve member 133. This causes the actuation surfaces 135 to engage locking balls 166 and bias them radially inwardly into receptacle 170. Thus, the locking balls couple together sleeve assembly 160 and input member 194 for joint axial movement. During operation in the manual mode, the input member is effectively coupled by the locking balls directly to the sleeve assembly so that the resilient block is rendered ineffective and the false travel or lost-motion is eliminated, wherein the vehicle operator's movement of input member 194 results in direct axial displacement of sleeve assembly 160 against piston 34, resulting in operation of the vehicle's braking system.

Figure 4:
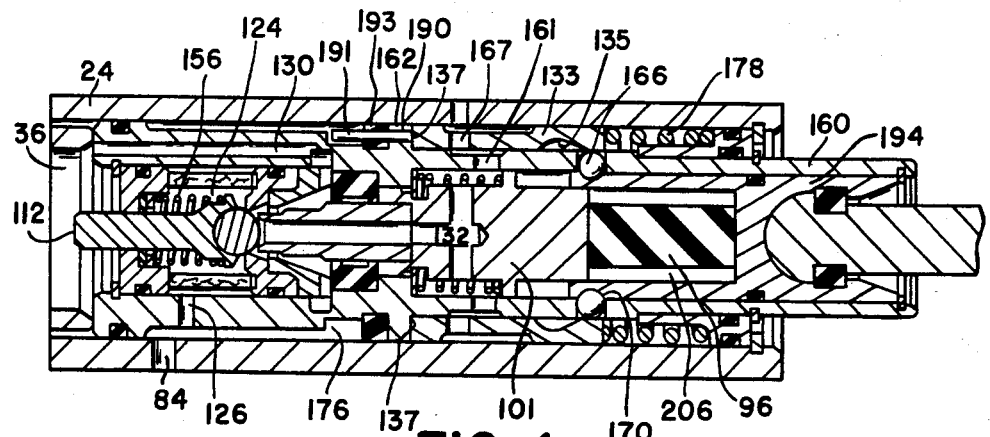
FIG. 4 is a third and preferred embodiment of the invention shown in the manual mode of operation.
Figure 4A:
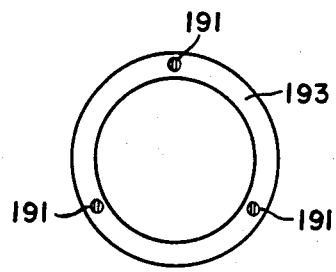
FIG. 4a is an end view of certain components of FIG. 4.

FIG. 4 illustrates the preferred embodiment of the present invention, with like structure indicated by the same numerals as above, and illustrates the manual mode of operation. The structure is the same as in FIG. 3 except for the inclusion of flange 162 of sleeve assembly 160 which has openings 190 slidably receiving pins or pistons 191 extending through adjacent circular seal 193 (FIG. 4a). It is desirable that the false-travel lockout effected by sleeve member 133 when fluid pressure fails in chamber 176, occurs before the pressure in chamber 176 reaches zero thereby avoiding a partial power/partial manual operation during application of the brakes. To accomplish this, the surface are of sleeve member end 137 exposed to the pressure in chamber 176 is effectively limited so that sleeve member 133 will move toward first piston 34 and wedge balls 166 into receptacle 170 (as illustrated) before the accumulator reaches its precharge pressure. Seal 193 shields end 137 from the fluid pressure in chamber 176, the fluid pressure acting on the surface area of pistons 191 which abut end 137. By varying the size and number of pistons 191, sleeve member 133 can be actuated at any predetermined pressure in chamber 176. The power and manual modes of operation are the same as for the embodiment of FIG. 3.

Figure 5:
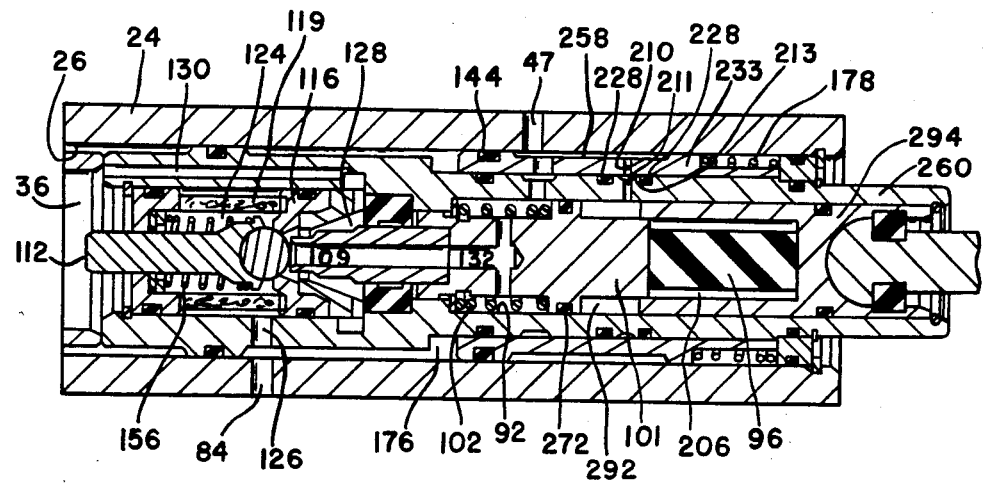
FIG. 5 is a fourth embodiment of the invention.

Turning now to FIG. 5, a fourth embodiment is illustrated for the present invention and like structure is indicated by the same reference numerals as above. The sleeve member 233 includes additional radial passage 210 aligned with radial passage 211 and groove 213 of a sleeve assembly 260. Radial passages 210 and 211 communicate with the housing bore 26 to permit venting of fluid from bore chamber 292 to the reduced diameter section 258, compensation port 47, and reservoir 44. Valve member 101 has circumferential seal 272 separating chambers 206 and 292 from the portion of interior bore 92 containing spring 102. As described above, during full power operation axial displacement of input member 294 results in compression of resilient block 96, with fluid in chambers 206 and 292 being vented via passages 211, 210 to compensation port 47 and reservoir 44. When a failure of fluid pressure occurs, such that reduced fluid pressure in chamber 176 permits the sleeve member 233 to be displaced axially by spring 178, passage 210 moves out of alignment with passage 211 in sleeve assembly 260, and thereby effectively isolates chambers 292 and 206 from port 47 and reservoir 44. Seals 228 ensure that when passages 210 and 211 are misaligned during a fluid pressure failure, chambers 292 and 206 are isolated from section 258 and reservoir 44. The hydraulic isolation of chambers 292 and 206 results in a hydraulic block being formed between input member 294 and sleeve assembly 260 so that axial displacement of input member 294 results in corresponding axial displacement of sleeve member assembly 260 and the elimination of lost motion travel provided previously by resilient block 96.

Many variations of the invention described herein are feasible by one skilled in the art, and as such, are intended to fall within the scope of the appended claims.

What is claimed is:

1. In a hydraulic brake booster, a connection with an accumulator for storing fluid pressure used selectively during braking to provide a power assist, a booster housing forming a bore communicating with the accumulator, a pair of pistons movable within the bore to communicate fluid from the bore to respective brake circuits during braking, a sleeve assembly disposed within the bore and cooperating with one of the pistons to form a power chamber, the sleeve assembly carrying a pair of valve members one of which normally closes communication between the power chamber and the accumulator and the other normally venting the power chamber to a reservoir, an input member cooperating with the pair of valve members to move the valve members during braking such that the one valve member communicates the accumulator with the power chamber and the other valve member closes communication between the power chamber and the reservoir, the input member cooperating with the pair of valve members by means of a resilient member, characterized in that said sleeve assembly includes a reduced diameter portion forming a sleeve chamber between said reduced diameter portion and the bore, and an axially movable sleeve member disposed about the sleeve assembly, the sleeve chamber communicating with the accumulator to receive pressure therefrom and the sleeve member being axially biased by spring means disposed between said sleeve member and an abutment disposed in said bore of the housing, the sleeve assembly including a radial opening having locking means located therein, the sleeve member having an actuation surface for engaging the locking means, and the input member having receptacle means disposed opposite said locking means, failure of the accumulator to provide fluid pressure to said sleeve chamber permitting said spring means to displace axially said sleeve member so that the actuation surface causes the locking means to engage said receptacle means and lock together the input member and sleeve assembly for joint axial displacement during a brake actuation.

2. The hydrualic brake booster in accordance with claim 1, wherein the sleeve assembly and the sleeve member each include a radial passage adjacent a housing passage to permit fluid flow from the other valve member to the reservoir.

3. The hydraulic brake booster in accordance with claim 2, wherein the sleeve assembly includes an interior bore having the other valve member disposed therein, the other valve member biased by a spring into engagement with the resilient member disposed between the input member and other valve member.

4. The hydraulic brake booster in accordance with claim 3, wherein the other valve member includes an extension which is maintained in position by a reaction disc disposed within the sleeve assembly.

5. The hydraulic brake booster in accordance with claim 1, wherein the sleeve assembly includes an interior bore positioning therein a valve seat sealingly receiving the one valve member and located between a spacer and a fluid filter.

6. The hydraulic brake booster in accordance with claim 1, wherein the input member includes an interior chamber having the resilient member disposed therein, the interior chamber also receiving an end of the other valve member, the other valve member, input member, and resilient member being disposed with an interior bore of the sleeve assembly, and the other valve member biased by a spring toward the resilient member.

7. The hydraulic brake booster in accordance with claim 1, wherein the locking means further comprises a plurality of balls disposed within a plurality of radial openings located circumferentially about the sleeve assembly.

8. The hydraulic brake booster in accordance with claim 7, wherein the actuation surface comprises a ramp which, upon failure of hydraulic pressure, biases the balls radially inwardly into the receptacle means.

9. In a hydraulic brake booster, a connection with an accumulator for storing fluid pressure used selectively during braking to provide a power assist, a booster housing forming a housing bore communicating with the accumulator, a pair of pistons movable within the bore to communicate fluid from the bore to respective brake circuits during braking, a sleeve assembly disposed within the bore and cooperating with one of the pistons to form a power chamber, the sleeve assembly carrying a pair of valve members one of which normally closes communication between the power chamber and the accumulator and the other normally venting the power chamber to a reservoir, an input member cooperating with the pair of valve members to move the valve members during braking such that the one valve member communicates the accumulator with the power chamber and the other valve member closes communication between the power chamber and the reservoir, the input member cooperating with the pair of valve members by means of a resilient member, characterized in that the sleeve assembly includes a reduced diameter portion having an axially movable sleeve member disposed thereabout, the housing bore, sleeve assembly and sleeve member defining a sleeve chamber receiving fluid pressure from the accumulator, the sleeve chamber having a radial dimension extending between the sleeve assembly and surface of the bore, the sleeve member biased axially by resilient means, and actuable coupling means for coupling together for joint movement with the sleeve member, sleeve assembly and input member, a decrease of fluid pressure in the sleeve chamber resulting in axial movement of the sleeve member and actuation of the coupling means to couple together the sleeve member, sleeve assembly and input member.

10. The hydraulic brake booster in accordance with claim 9, wherein the sleeve member includes piston means extending through a circumferential seal into the sleeve chamber, the piston means subjected to the fluid pressure from the accumulator.

11. The hydraulic brake booster in accordance with claim 10, wherein the piston means comprises a pin member abutting the sleeve member.

12. The hydraulic brake booster in accordance with claim 10, wherein the sleeve assembly includes a circumferential flange having an opening slidably receiving the piston means.

13. The hydraulic brake booster in accordance with claim 12, further comprising a plurality of piston means disposed about the sleeve assembly and slidably extending through respective flange openings.

14. The hydraulic brake booster in accordance with claim 9, wherein the coupling means comprises aligned fluid passages in the sleeve member and sleeve assembly that permit fluid communication from an interior bore of the sleeve assembly to the reservoir.

15. The hydraulic brake booster in accordance with claim 9, wherein the input member has an input chamber receiving therein the resilient member.

16. The hydraulic brake booster in accordance with claim 9, wherein the other valve member includes an enlarged diameter portion housing seal means and providing a shoulder for a spring disposed in an interior bore of the sleeve assembly.

17. The hydraulic brake booster in accordance with claim 9, wherein the coupling means comprises a ramp in the sleeve member, balls in openings of the sleeve assembly, and receptacles in the input member.

18. The hydraulic brake booster in accordance with claim 17, further comprising seal means between the sleeve member and sleeve chamber, the sleeve member engaging piston means extending into the sleeve chamber and the piston means responsive to fluid pressure in the sleeve chamber.

* * * * *